(12) United States Patent
Golds et al.

(10) Patent No.: US 8,131,778 B2
(45) Date of Patent: Mar. 6, 2012

(54) DYNAMIC AND VERSATILE NOTEPAD

(75) Inventors: David Golds, Redmond, WA (US);
Stephanie Teng, Seattle, WA (US);
Jason Silvis, Bellevue, WA (US);
Michael Smuga, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 12/040,863

(22) Filed: Feb. 29, 2008

(65) Prior Publication Data
US 2009/0055415 A1 Feb. 26, 2009

Related U.S. Application Data

(60) Provisional application No. 60/968,035, filed on Aug. 24, 2007.

(51) Int. Cl.
*G06F 17/30* (2006.01)
(52) U.S. Cl. ........................ 707/804; 707/809
(58) Field of Classification Search .................. 707/804, 707/809
See application file for complete search history.

(56) References Cited

U.S. PATENT DOCUMENTS

| | | | | |
|---|---|---|---|---|
| 5,625,377 A * | 4/1997 | Jenson | ........................... | 715/860 |
| 6,400,942 B1 | 6/2002 | Hansson et al. | | |
| 7,082,298 B2 | 7/2006 | Enns et al. | | |
| 2003/0092454 A1 | 5/2003 | Halim et al. | | |
| 2004/0196313 A1 * | 10/2004 | Wynn et al. | .................... | 345/779 |
| 2005/0091120 A1 * | 4/2005 | Auletta | ........................... | 705/26 |
| 2005/0215271 A1 | 9/2005 | Sim et al. | | |
| 2006/0150106 A1 | 7/2006 | Jokinen et al. | | |
| 2007/0010292 A1 | 1/2007 | Vetelainen et al. | | |
| 2007/0067738 A1 | 3/2007 | Flynt et al. | | |
| 2007/0082686 A1 | 4/2007 | Mumick et al. | | |
| 2007/0168892 A1 * | 7/2007 | Brush et al. | .................... | 715/963 |
| 2007/0174388 A1 | 7/2007 | Williams | | |
| 2008/0005168 A1 * | 1/2008 | Huff et al. | ................... | 707/104.1 |
| 2008/0065758 A1 * | 3/2008 | Narayanaswami | ........... | 709/224 |
| 2008/0102889 A1 * | 5/2008 | May et al. | ................... | 455/556.2 |

FOREIGN PATENT DOCUMENTS

EP 1113631 A2 4/2001

OTHER PUBLICATIONS

Unknown, "OneNote Mobile 2007 quick start guide," available at http://office.microsoft.com/en-us/onenote/HA101956221033.aspx, printed on Sep. 14, 2007, 11 pages.
Unknown, "Free Notes for WM 5.0," available at http://www.ps-bsh. com/component/option,com_bshshop/act,object/task,showEO/ id,24/lang,english/Software description, 2006, 2 pages.

(Continued)

*Primary Examiner* — Kim Nguyen
(74) *Attorney, Agent, or Firm* — Senniger Powers LLP

(57) ABSTRACT

Method for providing a versatile notepad for social networking and interactions with a plurality of users. An input content is received from a user. The received input content is analyzed based on at least the following expression types: expression indicative of time, expression indicative of a location, expression indicative of a statement, expression indicative of an individual, an expression indicative of a list, and a combination of expressions indicative the time, the location, the statement, the list, and the individual. The analyzed information is dynamically converted to a communication object as a function of the expression types. The communication object is rendered to the user.

14 Claims, 10 Drawing Sheets

OTHER PUBLICATIONS

Unknown, "Your Today Screen just became Tomorro's Screen!," available at http://www.sbsh.net/products/pocketbreeze/, 2002, 6 pages.

Unknown, "Ericsson Mobile Organizer 5.1—Push E-Mail," available at http://www.ericsson.com/solutions/enterprise/library/brochures_datasheets/EMO/emo_1023745.pdf, 2006, 4 pages.

* cited by examiner

CHAT SESSION:

HEY, WANNA MEET FOR DRINKS TONIGHT? MAYBE INVITE SUSAN AND JACK?

JIM (3:18PM, WED DEC. $7^{TH}$)
SOUNDS GREAT! THE USUAL PLACE? WHEN?

CALENDAR OBJECT:
CYCLOPS MAP/DIRECTION
8 PM TONIGHT

ADD STAMP | YES | NO

DYNAMIC AND VERSATILE NOTEPAD

CROSS REFERENCE OF RELATED APPLICATION

This application is a non-provisional of U.S. Provisional Patent Application Ser. No. 60/968,035, filed Aug. 24, 2007, the entire text of which is hereby incorporated by reference.

BACKGROUND

Among PC and mobile based social networking, text messaging and email, social communication and information sharing have evolved to enable users to stay connected wherever they are. What is still lacking, however, is a system that ties all of these avenues together in a seamless and rich way, leaving gaps in group communication and parsing context-sensitive information. Some of the fundamental limitations in the mobile space specifically are: messages are plain text and cannot accommodate rich media (graphics, HTML); the messages are limited by size (160 characters); SMS messages do not offer the ability to easily coordinate with multiple people; SMS messages lack context retention; SMS messages are a one-time event; web-based experiences and mobile email do not integrate with SMS and therefore require all parties to have data service; sharing and storing content mobile content outside of the phone is a generally cumbersome process. In other words, the user must create content based on the pre-determined application or software capabilities in order to generate content from a mobile device.

The mobile market is ready for a type of disruptive technology that encapsulates the essence of today's communication models available on the PC for the mobile phones and permits a communication's recipient to interact with and store this communication in multiple ways.

SUMMARY

Embodiments of the invention provide a dynamic conversion of input content from the user to discrete communication objects based on the context of the content. Aspects of the invention remove the necessary and customary association of data types or data objects according to the applications or software the data type associated therewith. For example, in creating a new appointment, a user must go to a scheduling or calendar-organizing software in creating an appointment. Similarly, the user must use an e-mail or a message communication software or application or a web service in order to send an e-mail to a recipient.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
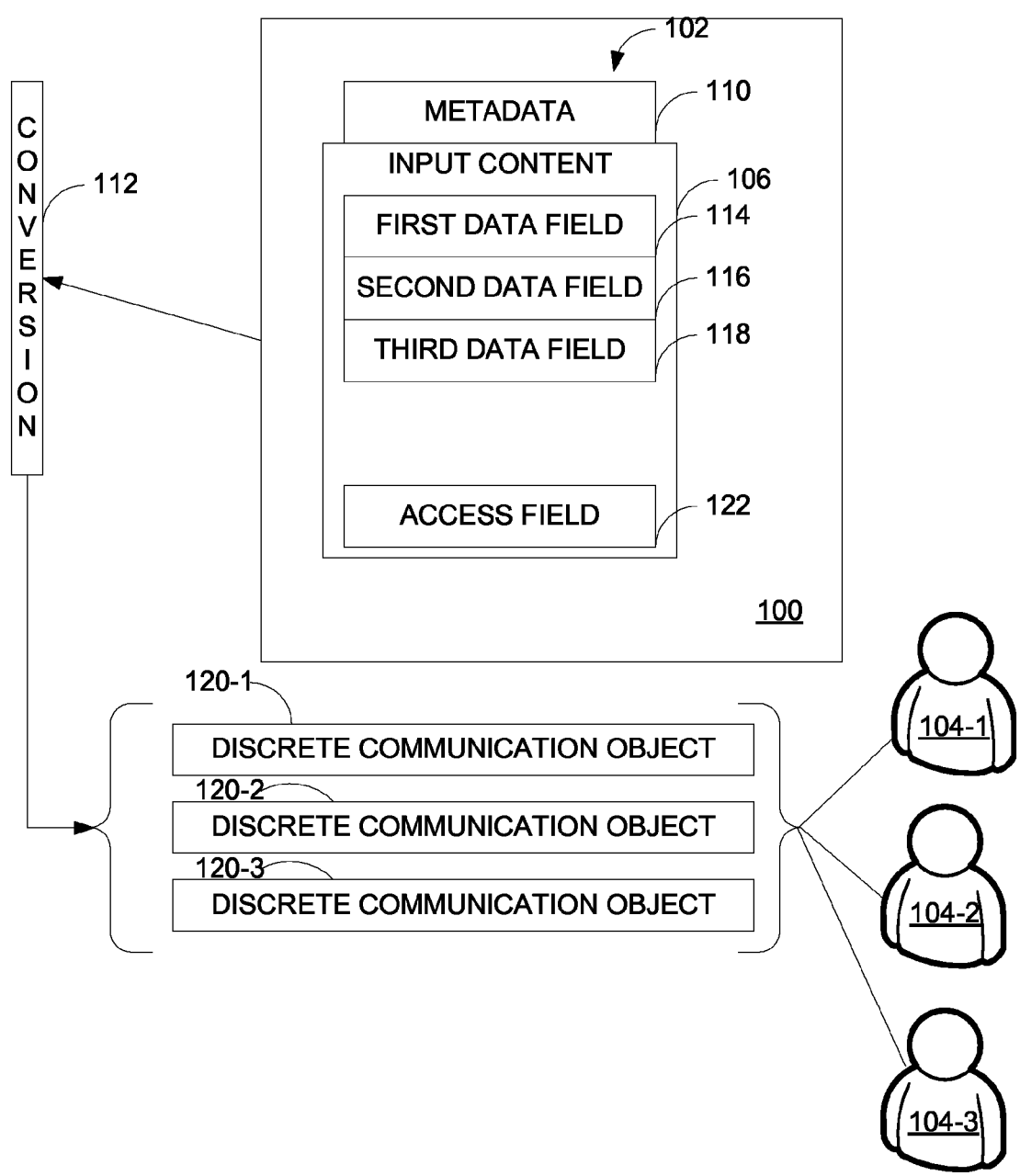
FIG. 1 is a block diagram illustrating a computer storage medium having a data structure stored thereon for providing a dynamic input content according to an embodiment of the invention.

Embodiments of the invention enhance the experience of a user of a portable or mobile device by providing a versatile notepad that accepts and recognizes a combination of already-familiar entities such as an email message, calendar item, task item, post-it note, wiki, or journal item. Embodiments of the invention convert or morph the received input content into one or a combination based on the metadata assigned by the user or the input data content.

In addition, embodiments of the invention provide at least one or more features and/or benefits below:

1. providing a dynamic and flexible data structure component that encompasses many properties, such as time, place, and people, or the like. Table 1 illustrates an exemplary outline showing the possibilities of benefits of aspects of the invention.

TABLE 1

| Type | Time | People | Place | PC Live Tie-in |
|---|---|---|---|---|
| To Do, Note | | | | Mobile portal, eventually |
| Location Graffiti, Place recommendation/comment | | | X | Search - signed-in experience; public signed out experience. Need to sync with ratings |
| Group message | | X | | Social network (e.g., blog) - if in a group it relates to the group experience |
| Let's meet up | | X | X | Social network - if user selects, event space<br>Search - if public or selected |
| Alarm, Reminder | X | | | |
| Open invite, event, appointment | X | | X | |
| Virtual meet up, call | X | X | | |
| Event Meet up | X | X | X | Social network - if user selects, event space |

2. enabling the incorporation of rich media such as attachments, graphics, videos, and music;

3. providing a rich data structure with many attributes. In addition, The SMS user will also be able to interact with the note by using a set of commands. However, alternative embodiments of the invention may also maintain the option to have the data structure providing the basic information when a user's device does not support the full richness. For example, an SMS user may send a 120-character message (the first 120 characters of the note), plus up to 40 characters of URL to a WAP page that contains the full fidelity information based on aspects of the invention;

4. providing an option to explicitly send the content to recipients or implicitly share the content with other users;

5. sharing input content to others such that others may browse or select other people's notes (with permitted access) and subsequently add to their own collections. Aspects of the invention may establish a platform for a living entity that can be modified over time;

6. enabling permission setting when the input content can be shared among multiple parties;

7. in one embodiment, the input content may maintain a context in a thread like form;

8. enabling various levels of privacy stamps (public, friends, or private), especially in the embodiments where sharing of the input content is enabled or activated;

9. enabling convenient accessibility from both mobile phones and PCs; and 10. enabling the input content be presented and/or updated via representations in other online services such as maps, contacts, calendar, blogs, social networks, etc, or in similar services from third party providers.

FIG. 1 is a block diagram illustrating a computer storage medium 100 having a data structure 102 stored thereon for providing a dynamic input content according to an embodiment of the invention. In one embodiment, the computer storage medium 100 may be a storage medium similar to the computer storage medium described in FIG. 4. The data structure 102 includes a content field for generally storing data from input content from a user, such as a user 104-1.

In one embodiment, input content to be stored in the content field 106 from the user includes data having a variety of content context or subject matter. For example, the input content from the user may be a list of to-do tasks, such as items to be purchased from a grocery supermarket. In another embodiment, the input content may be a brief text note for setting up a lunch appointment between the user 104-1 and a user 104-2. As such, the content field 106 stores all information or data associated with the input content. The data structure 102 further includes a metadata data field 110 for providing information about the content field 106. In one embodiment, the user 104 may enter the data or information in the metadata field 110 manually. In another embodiment, the metadata field 110 may be automatically filled or included with data as the input content is dynamically converted to a discrete communication object.

In one embodiment, information or data in the content field 106 is further converted or analyzed during a conversion process/component/engine 112 such that parts of the content field is further entered into a first data field 114, a second data field 116 and a third data field 118. In one example, the conversion process or component or engine 112 analyzes the content in the content field 106 and, based on the context of the content, the conversion engine 112 converts the analyzed content to the first data field 114, the second data field 116 or the third data field 118. For example, the first data field 114 may store content information expressed relating to time, such as 3:00 pm, Tuesday, January 5, year 2008, tomorrow, tonight, next weekend, or the like. The second data field 116 may store content information expressed relating to a location, such as a restaurant, one's house, a movie theatre, a name of a restaurant, a city, a country, an address of a location, or the like. Also, the third data field 118 may store content information expressed relating a person, such as a name of a person, one's relatives, or the like. It is to be understood that other fields may be included or used storing a specific type of information may be used without departing from the scope or spirit of the invention.

The conversion engine 112 further analyzed the content information in the stored first data field 114, the second data field 116, and the third data field 118 to generate discrete communication objects 120. For example, the discrete communication objects 120 may be an electronic mail object, a note object, a calendar object, an instant messaging object, a task object, a SMS message object or the like. In an alternative embodiment, the discrete communication objects 120 may be presented within the same display space. In another embodiment, the discrete communication objects 120 may individually displayed or provided in separate display spaces to the user. For example, the discrete communication objects 120 may be generated while a user is composing another discrete communication object. Additional examples of various operations of the conversion are exemplarily illustrated in FIGS. 2A to 2G.

In another embodiment, the computer storage medium 100 may be part of a system that enables dynamic note conversion to intelligent discrete communication objects. For example, the system may be part of a portable device having a display, a processor (or micro-processor), a memory storage area, a user interface, and other connectivity interfaces. The system may incorporate the data structure 102 for storing content received from the user via the user interface of the portable device and the conversion engine 112 performs its functions to convert the input content to discrete communication objects. In a further alternative embodiment, the data structure 102 may be part of a social network where the parts of or entire data structure 102 may be shared among different users. In this embodiment, an access field 122 may be used to denote or indicate the various sharing settings or status. For example, the access field 122 may include status information such as: private, public, public only to a specific group of individuals, or the like. In another embodiment, the user 104 may determine the members in the specific group for sharing.

In one embodiment, the dynamic conversion of the input content, also referred to as "dynamic notes" below, may be a fundamental element for enabling social networking for mobile users. It may be a cloud-based text entity that may be enhanced with additional properties for enriched metadata. This dynamic and multi-purpose capability may change its' behavior to accommodate the user's needs. The dynamic notes can morph into a calendar item, email message, SMS message, or a mini-wiki based on the metadata that it has (example: time, location, and people). In another alternative embodiment, the dynamic notes can interact with other online services, accessible via phone or PC. The dynamic notes also have a permissions property that permits them to be viewable to and jointly editable by a user, a specific list of contacts, and/or the general public. In another embodiment, content in the dynamic note can be created by one participant, multiple participants, or the final note can be a result of voting on various aspects of the note.

Furthermore, dynamic note is an augmentation of today's messaging technology by enabling dynamic construction of the content based on metadata. In one embodiment, a "note"

may be a basic currency of a Catalyst ecosystem. Much like a paper note, a Catalyst note is a container that holds at minimum a "what"—an editable piece of text that conveys information of some kind (self expression, a directed message for example). However, instead of sending new notes back and forth and therefore quickly losing context, the same note is passed back and forth, adding to it each time. This is in essence, threaded SMS.

Additional information can be added to a note at anytime such as a specific location ("where") and time ("when"), which may be done through editing the note's core text or by adding richer data via the "stamp". The stamps, which are essentially specific, structured information, may contain a range of information types, examples of which are a date/time, a location, request for RSVP, request for a vote on attributes and others. The goal of individualizing each "stamp" into an individual unit is to make adding information more palatable than if the user were presented with a form.

Users may then send and/or share the core text of the note and its optional attributes with individuals from the Windows Live/phone's contact list who may also be permitted to edit attributes of the note independently.

In an alternative embodiment, the dynamic note may contain a core functionality (and simplicity) of an SMS message, but allow additional structured data to be added as well.

In one example, FIGS. 2A to 2G illustrate exemplary screen displays illustrating a versatile or dynamic notepad according to an embodiment of the invention. For example, in FIG. 2A, a user enters an input content "MEETING WITH DAVID AT 2:00 PM" on the dynamic notepad interface as a note to himself, just like a paper notepad one frequently uses. Embodiments of the invention dynamically convert and morph this simple notepad content to a calendar appointment as show on FIG. 2B. In other words, the user does not need to separate execute an application that organizes a calendar of events of the user. The user only needs to execute the dynamic notepad and enter the needed text and the desirable end result is achieved.

Figure 2A:
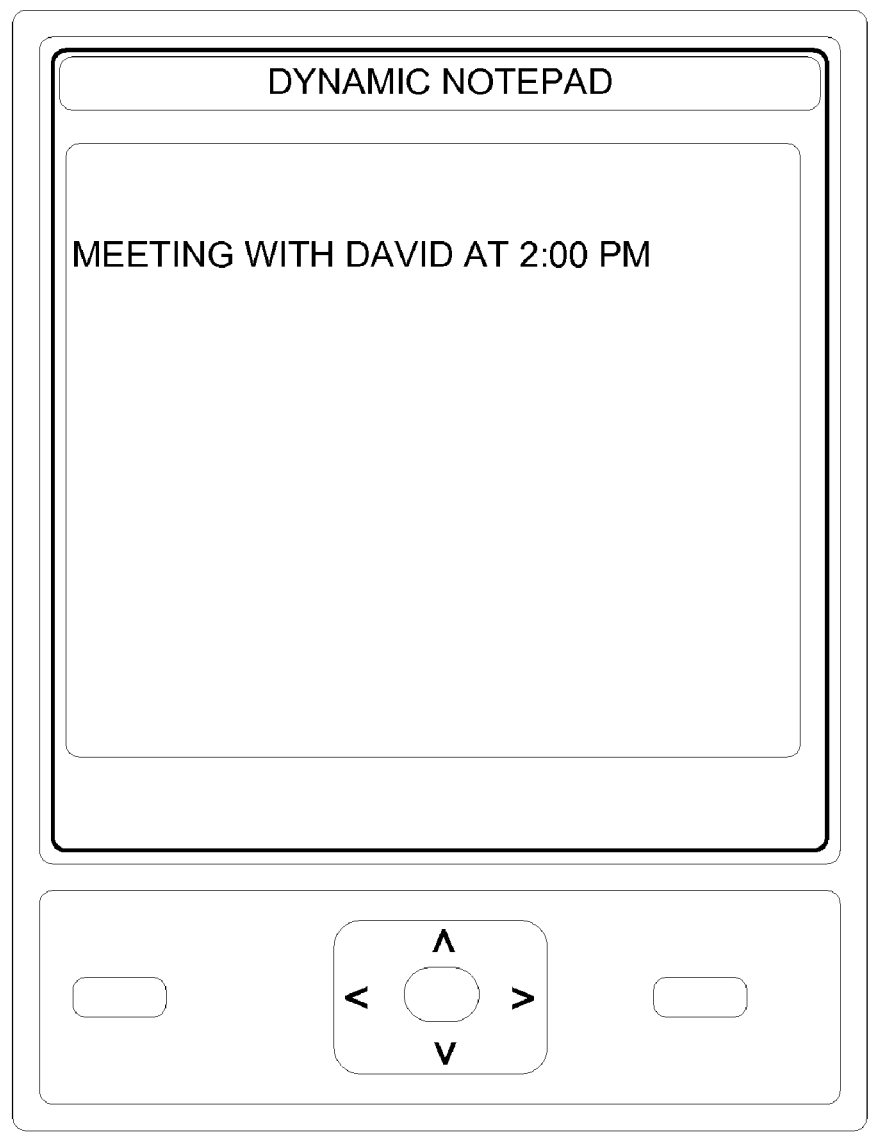
FIGS. 2A to 2G are screen displays illustrating a versatile notepad according to an embodiment of the invention.
Figure 2B:
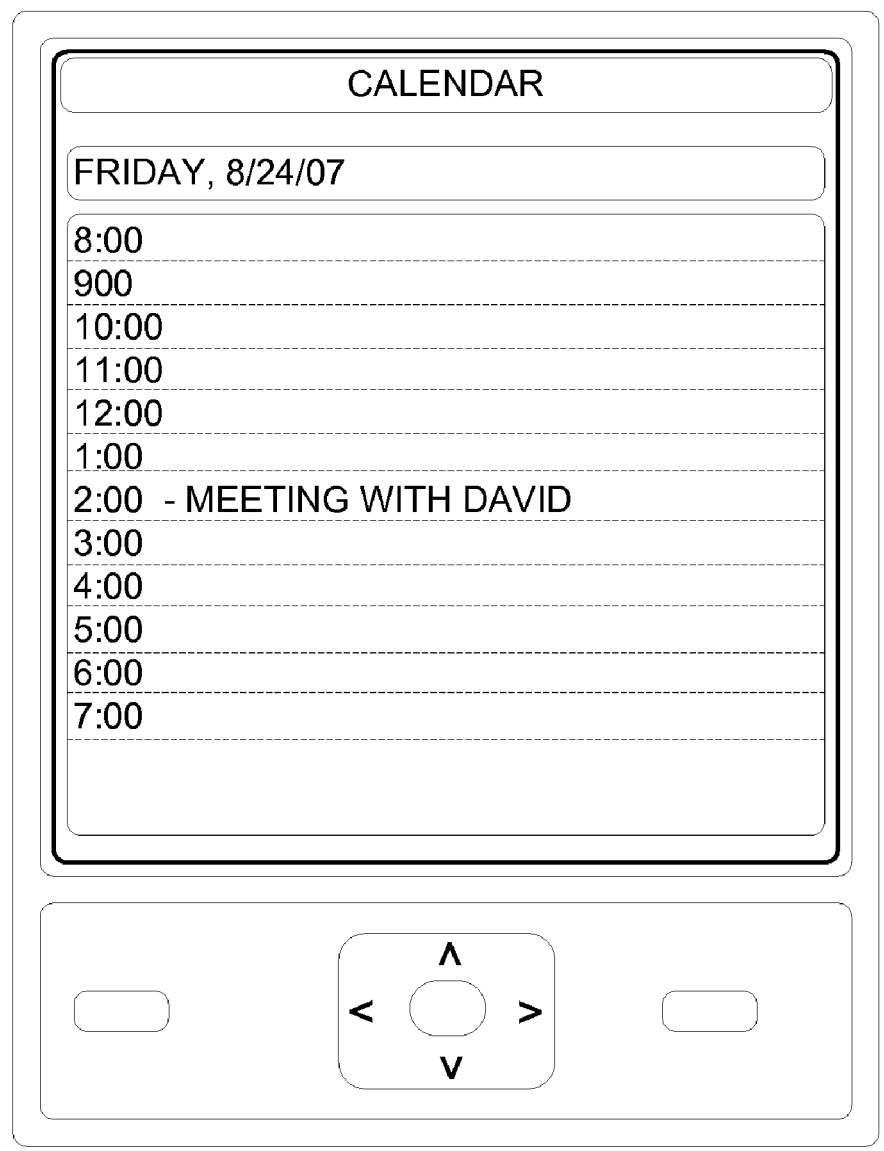
Figure 2C:
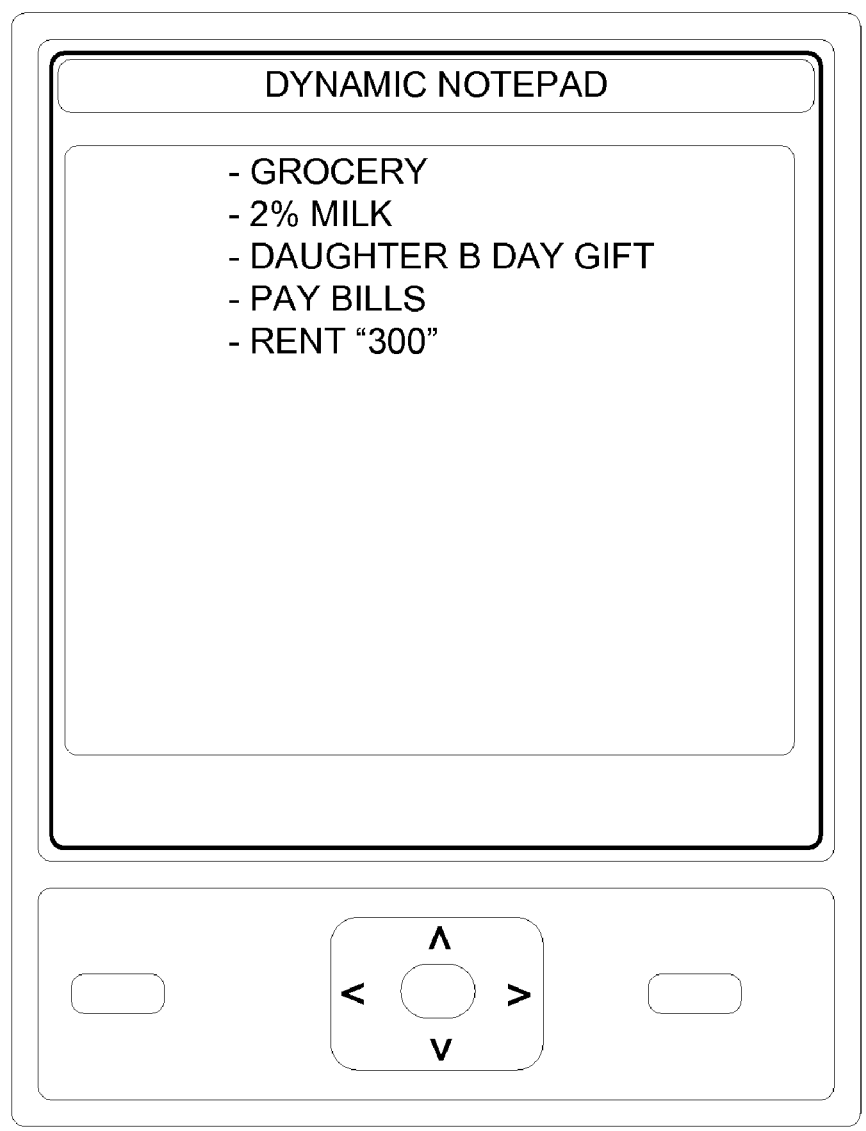
Figure 2D:
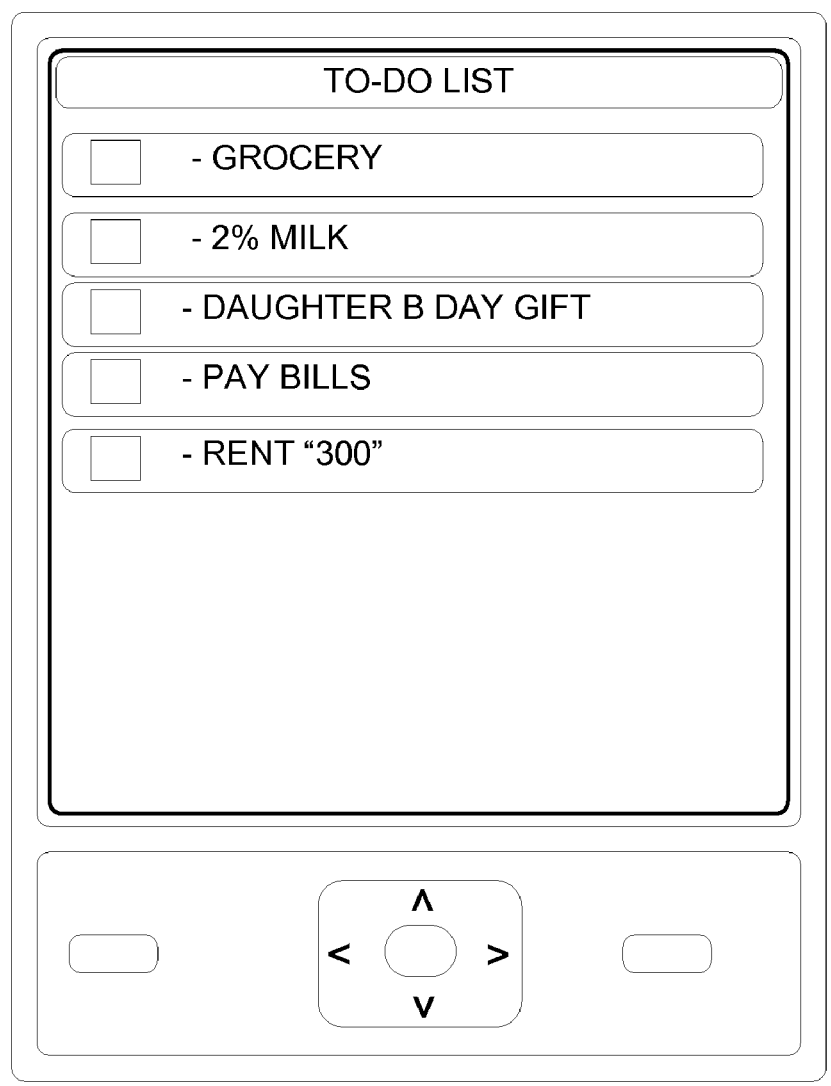
Figure 2E:
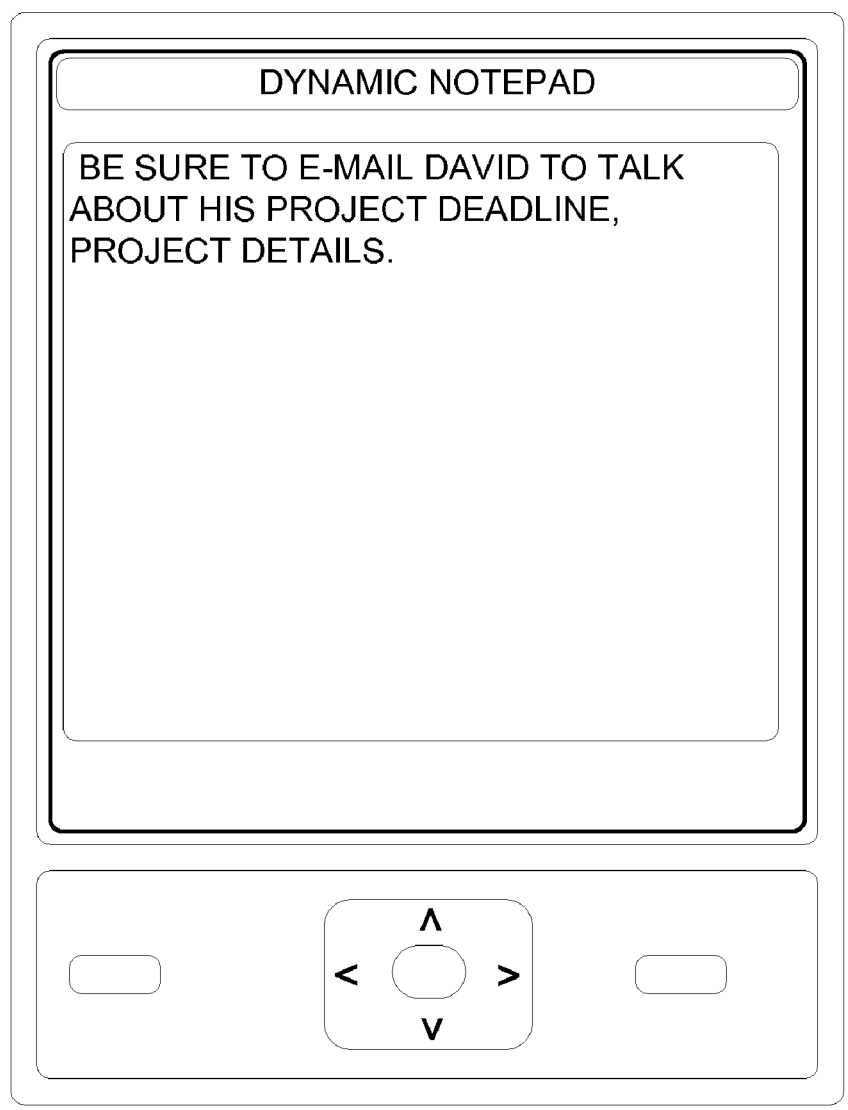
Figure 2F:
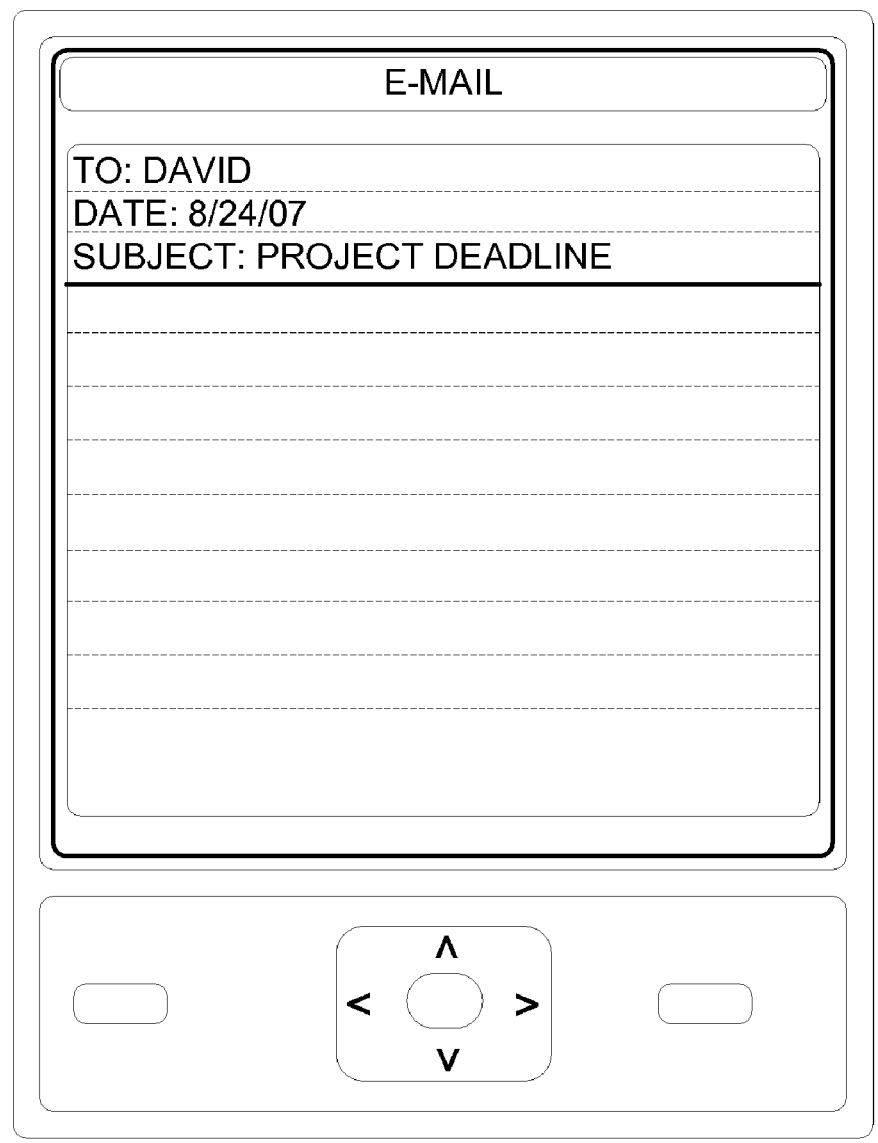
Figure 2G:

In another example, the user enters a series of items in a list on the dynamic notepad in FIG. 2C. The dynamic notepad converts the list to a list in a to-do list for the user in FIG. 2D. Similarly, FIG. 2E illustrates a note from the user indicating a reminder to send e-mail to David to discuss project deadline. The dynamic notepad in FIG. 2F converts the content to an e-mail message ready to send to David with David's e-mail address retrieved from the user's contact list. In one embodiment, various discrete communications objects 120 may be presented on the same display space, as illustrated in FIG. 2G.

It is to be understood that other examples can be achieved without departing from the scope and spirit of the invention.

Figure 3:
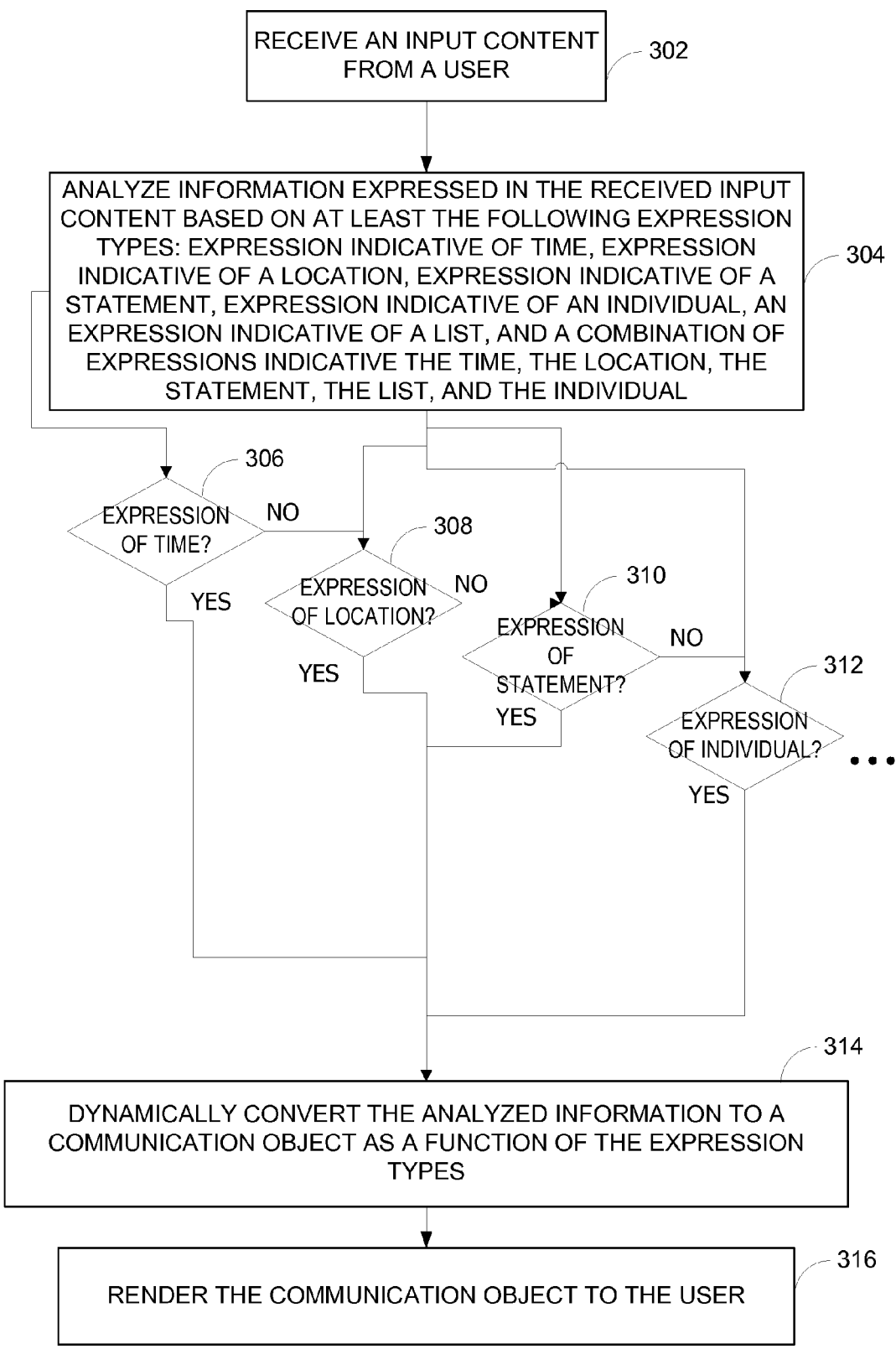
FIG. 3 is an exemplary flow chart illustrating operation of providing a versatile notepad and converting input content on the notepad to a communication object according to an embodiment of the invention.

FIG. 3 is a flow diagram illustrating operations of providing a versatile notepad according to an embodiment of the invention. In one embodiment, the operations may be manifested in computer-executable instructions, computer-executable codes, scripts, or the like. Also, the operations of aspects of the invention may be executed by processors coupled to the portable devices or computing devices. At 302, an input content from a user. For example, the input content may be a typed via a text-entry input device. In another example, the input content may be received through a stroke-sensitive or touch-sensitive screen as the user uses a stylus or other writing instruments. At 304, the information from the received input content is analyzed based on at least the following expression types: expression indicative of time, expression indicative of a location, expression indicative of a statement, expression indicative of an individual, an expression indicative of a list, and a combination of expressions indicative the time, the location, the statement, the list, and the individual. For example, the conversion engine 112 in FIG. 1 or other conversion-related computer-executable instructions may analyze the input from the input content to identify various expression types. In one embodiment, the conversion may first involve parsing or identifying information of the input content. The parsed or identified information is next analyzed. As illustrated, the analysis involves going through a series of determination steps. For example, at 306, a determination is used to determine whether the input content includes an expression of time. At 308, a determination is made whether the input content includes an expression of a location. Another determination is made whether the input content includes an expression of a statement at 310. At 312, another determination may be made whether the input content includes an expression an individual.

Once the determinations are made, the analyzed information is converted to a communication object as a function of the expression types at 314. For example, for an expression of time and/or an expression of an individual may be converted to an appointment communication object. Similarly, an expression of time and/or an expression of a statement may be converted to a calendar communication object or a task communication object. At 316, the converted communication object is rendered to the user. In one embodiment, the converted communication object may be rendered to one or more users with varying degree of access rights or privileges. For example, the calendar communication object may be shared with the user's friends, family members, or other individuals. In another embodiment, the communication objects may be rendered or displayed to the user or users in combination or in conjunction with other communication objects, such as FIG. 2G.

Figure 4:
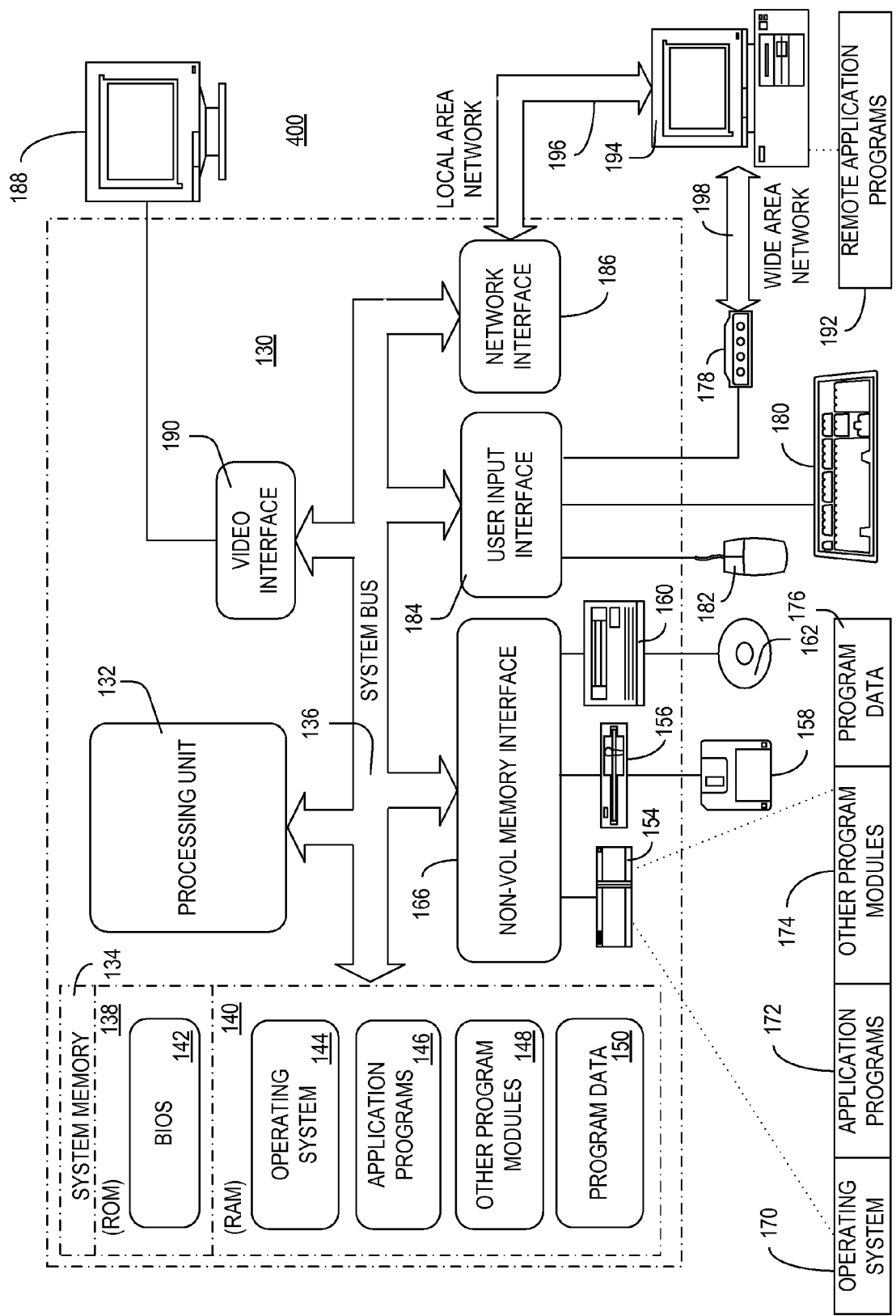
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but maybe connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention.

Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for providing a versatile notepad, said method comprising:
   receiving an input content from a user at a dynamic notepad interface, during said receiving the input content, dynamically:
      determining information expressed in the received input content to correspond to at least one of the following predetermined expression types: an expression of time, an expression of a location, an expression of a statement, an expression of an individual, an expression of a list, and a combination of expressions of the time, the location, the statement, the list, and the individual;
      converting the determined information to a format of its corresponding one or more of the predetermined expression types;
      populating a separate data field of a data structure with the converted information based on the corresponding expression type of the converted information, each data field of said data structure corresponding to a different predetermined expression type;
      determining one or more discrete communication objects that all the populated data fields of the data structure correspond to, wherein the received input does not specify said one or more discrete communication objects;
   without further user input, dynamically generating at least one of said one or more determined discrete communication objects from the determined information, wherein the communication object is different from the dynamic notepad interface; and
   rendering the generated communication object to the user.

2. The method of claim 1, further comprising receiving a metadata designation from the user, said metadata designation including information describing the expression types of the input content.

3. The method of claim 2, wherein determining comprises analyzing the metadata designation, and wherein said determining one or more discrete communication objects is a function of the metadata designation, wherein the metadata designation does not specify the one or more discrete communication objects.

4. The method of claim 1, wherein the input content from the user includes one or more of the following: a text content and a graphical content.

5. The method of claim 4, wherein determining comprises semantically analyzing the received text content based on at least the following expression types: expression indicative of time, expression indicative of a location, expression indicative of a statement, expression indicative of an individual, an expression indicative of a list, and a combination of expressions indicative the time, the location, the statement, the list, and the individual.

6. The method of claim 1, wherein the one or more discrete communication objects comprises a text message for processing, a computer-executable object for an application, and a computer-executable component for an application.

7. The method of claim 1, wherein the one or more discrete communication objects comprises an appointment object, an electronic mail (e-mail) object, a task object, a to-do object, an instant messaging object, a private message object, a location/map description object, or an asynchronous "note" object.

8. The method of claim 1, wherein generating comprises converting, based on the determined information, one or more of the following: a combination of expressions indicative of a time and an individual to an appointment object, a combination of expressions indicative of a time and a location to an appointment object, a combination of expressions indicative of an individual and a statement to an e-mail object, a combination of expressions indicative of an individual and a statement to an instant messaging object, an expression indicative of a list to a to-do object, and a combination of expressions indicative of a statement and a time to a task object.

9. The method of claim 1, further comprising providing access information associated with the communication object, said access information including one or more of the following information: access controls, joint ownership, access privilege, and editorial privilege.

10. A method for providing a versatile notepad for social networking and interactions with a plurality of users, said method comprising:
   receiving an input content from a user at a dynamic notepad interface;
   receiving metadata assigned by the user, said metadata describing the input content;
   determining the metadata assigned to the received input content, said metadata indicating at least one or more of the following expression types: an expression indicative of time, an expression indicative of a location, an expression indicative of a statement, an expression indicative of an individual, an expression indicative of a list, and a combination of expressions indicative of the time, the location, the statement, the list, and/or the individual;
   converting the received input content to a format of its indicative expression type;
   populating a separate data field of a data structure for each indicated expression type with the converted input content based on its expression type, each data field of said data structure corresponding to a different expression type;
   determining one or more discrete communication objects that all the populated data fields of the data structure correspond to, wherein the received input and the received metadata does not specify said one or more discrete communication objects;
   without further user input, dynamically generating one of said one or more determined discrete communication objects from the determined information, wherein the communication object is different from the dynamic notepad interface, said dynamically generating comprising generating a metadata designation including the metadata describing the input content; and
   selectively rendering the generated communication object to the user.

11. The method of claim 10, wherein selectively rendering comprises sharing the generated communication object with another user as a function of a user-defined sharing policy.

12. The method of claim 11, wherein the user-defined sharing policy comprises at least one of the following: private to all, private to friends, and public.

13. The method of claim 10, wherein generating comprises converting, based on the determined information, one or more of the following: a combination of expressions indicative of a time and an individual to an appointment object, a combination of expressions indicative of a time and a location to an appointment object, a combination of expressions indicative of an individual and a statement to an e-mail object, a combination of expressions indicative of an individual and a statement to an instant messaging object, an expression indicative of a list to a to-do object, and a combination of expressions indicative of a statement and a time to a task object.

14. The method of claim 10, wherein dynamically generating comprises dynamically generating the communication object from the input content as a function of the metadata designation.

* * * * *